United States Patent
Heinrich et al.

(10) Patent No.: US 12,436,787 B2
(45) Date of Patent: Oct. 7, 2025

(54) EMULATING PHYSICAL SECURITY DEVICES

(71) Applicant: HEWLETT PACKARD ENTERPRISE DEVELOPMENT LP, Houston, TX (US)

(72) Inventors: David F. Heinrich, Houston, TX (US); Luis E. Luciani, Jr., Houston, TX (US); Theodore F. Emerson, Houston, TX (US); Sze Hau Loh, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 792 days.

(21) Appl. No.: 16/861,780

(22) Filed: Apr. 29, 2020

(65) Prior Publication Data

US 2021/0342169 A1 Nov. 4, 2021

(51) Int. Cl.
| | |
|---|---|
| H04L 29/06 | (2006.01) |
| G06F 9/455 | (2018.01) |
| G06F 13/40 | (2006.01) |
| G06F 21/57 | (2013.01) |
| G06F 21/60 | (2013.01) |
| H04L 9/08 | (2006.01) |

(52) U.S. Cl.
CPC ...... *G06F 9/45508* (2013.01); *G06F 13/4027* (2013.01); *G06F 21/572* (2013.01); *G06F 21/602* (2013.01); *H04L 9/08* (2013.01); *G06F 2221/033* (2013.01)

(58) Field of Classification Search
CPC ............. G06F 9/45508; G06F 13/4027; G06F 21/572; G06F 21/602; G06F 2221/033; H04L 9/08
See application file for complete search history.

(56) References Cited

U.S. PATENT DOCUMENTS

| | | | |
|---|---|---|---|
| 7,590,867 B2 | 9/2009 | Scarlata et al. | |
| 10,742,421 B1* | 8/2020 | Wentz | H04L 9/0897 |
| 2004/0073806 A1* | 4/2004 | Zimmer | G06F 21/575 |
| | | | 713/189 |
| 2008/0313312 A1* | 12/2008 | Flynn | G06F 13/426 |
| | | | 709/224 |
| 2016/0364927 A1* | 12/2016 | Barry | G08B 25/10 |
| 2017/0366359 A1* | 12/2017 | Scarlata | H04L 63/12 |
| 2018/0060051 A1* | 3/2018 | Ramalingam | H04L 67/34 |
| 2018/0165455 A1 | 6/2018 | Liguori et al. | |
| 2018/0287791 A1* | 10/2018 | Basavarajaiah | H04L 63/04 |

(Continued)

OTHER PUBLICATIONS

Curt Hopkins, "The cloud goes 'cloudless'", available online at <www.hpe.com/us/en/insights/articles/cloudless-1906.html#Bio>, Hewlett Packard Enterprise Development LP, Jun. 18, 2019, 11 pages.

(Continued)

*Primary Examiner* — Evans Desrosiers
(74) *Attorney, Agent, or Firm* — Trop, Pruner & Hu, P.C.

(57) ABSTRACT

A technique includes a baseboard management controller receiving, from a requestor, a request for a security function to be performed, where the request is directed to a physical security device other than the baseboard management controller. The technique includes, the baseboard management controller responding to the request to emulate a response to the security device to the request.

20 Claims, 6 Drawing Sheets

(56) References Cited

U.S. PATENT DOCUMENTS

2019/0272245 A1* 9/2019 Olarig ................. G06F 13/1668
2020/0374269 A1* 11/2020 Lidman .................. H04L 63/10

OTHER PUBLICATIONS

Elad Wind, "OpenBMC Automates Cloud Operations," May 16, 2019, pp. 1-5, Mellanox, Retrieved from the Internet on Oct. 15, 2019 at URL: <blog.mellanox.com/2019/05/openbmc-automates-cloud-operations/>.

Eric Shobe and Jared Mednick, "RunBMC: OCP Hardware Spec Solves Data Center BMC Pain Points," Aug. 21, 2019, pp. 1-10, Dropbox, Inc., Retrieved from the Internet on Oct. 15, 2019 at URL: <blogs.dropbox.com/tech/2019/08/runbmc-ocp-hardware-spec-solves-data-center-bmc-pain-points/>.

Rongqiang Zhang, "Bringing the Openbmc for Platform Management System in Telco Cloud," Apr. 30, 2019, pp. 1-88, Helsinki Metropolia University of Applied Sciences, Helsinki, Finland.

Wikipedia; "OpenBMC"; https://en.wikipedia.org/wiki/OpenBMC; downloaded on Apr. 2, 2020; 3 pp.

* cited by examiner ized service processor, called a "baseboard management controller," or "BMC," which monitors the physical state of the computer system and communicates with a management system through a management network. As examples of its roles, the BMC may monitor sensors (e.g., temperature sensors, cooling fan speed sensors); monitor operating system status; monitor power statuses; log computer system events; and provide management functions for the computer system, which may be controlled remotely. Moreover, the BMC may allow operations to be performed when the computer system is powered down and before the operating system has booted; and the BMC may be used to perform recovery operations after an operating system or computer system failure.

EMULATING PHYSICAL SECURITY DEVICES

BACKGROUND

A computer system (e.g., a server) may include a specialized service processor, called a "baseboard management controller," or "BMC," which monitors the physical state of the computer system and communicates with a management system through a management network. As examples of its roles, the BMC may monitor sensors (e.g., temperature sensors, cooling fan speed sensors); monitor operating system status; monitor power statuses; log computer system events; and provide management functions for the computer system, which may be controlled remotely. Moreover, the BMC may allow operations to be performed when the computer system is powered down and before the operating system has booted; and the BMC may be used to perform recovery operations after an operating system or computer system failure.

DETAILED DESCRIPTION

Figure 1:
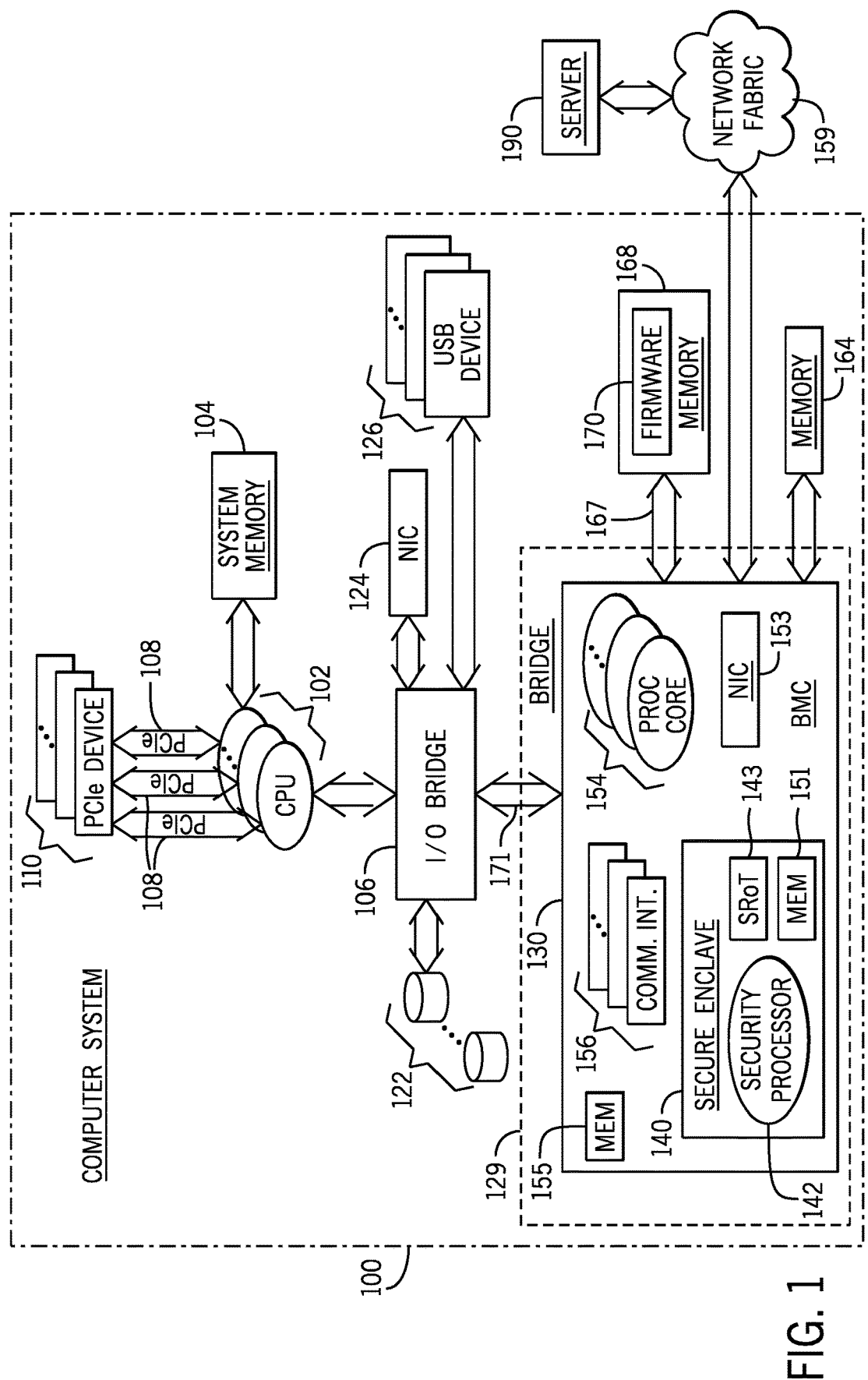
FIG. 1 is a schematic diagram of a computer system according to an example implementation.

A BMC may execute a set of firmware instructions, called a "firmware stack," for purposes of performing a variety of management-related functions (e.g., operating system runtime services, resource detection and initialization, pre-operating system services, and so forth) for a computer system, such as a server platform. The BMC may be a fairly complex subsystem that executes millions of instructions before the server platform is even powered on. Although the server platform may verify the integrity of the firmware stack before the BMC loads and executes the stack, the relatively large number of instructions of the stack potentially exposes the server platform to lurking undiscovered security vulnerabilities. Accordingly, customers for server platforms may want to manage the server platforms using open source firmware stacks, as opposed to using proprietary firmware stacks.

Moreover, a given customer may want to use the same open source BMC firmware stack to manage all of the customer's server platforms, regardless of the particular server platform vendor(s) for these platforms. The open source BMC firmware stack may be, as an example, firmware that is developed as part of the OpenBMC community, such as, release version 2.7 or latter versions, as well as other open source firmware. The customer may also expect that a particular security solution is to be used on all of its server platforms, regardless the platform vendors. An open source BMC firmware stack and portable security solution may be particularly advantageous for cloudless computing environments.

In this context, a "security solution" for a computer system refers to a set of security functions, or services, which are to be provided by the computer system. The security solution may include a set of predefined security functions that are defined by an application programming interface (API), such as functions to perform key management (e.g., functions to store and load cryptographic keys), firmware image validation, platform cryptographic identity retrieval, measurement hash loading, measurement hash retrieval, and so forth.

Due to the lack of security solution standardization, there is currently an option to use one or multiple security solutions for a given computer system, and the different security solutions may be associated with different hardware configurations. As an example, one security solution may involve the use of a secure enclave of a BMC to respond to specific security function API calls, perform the related security primitive(s) and generate the corresponding responses to the API calls. Other security solutions may use hardware other than a BMC. For example, a particular security solution may rely on a physical security interposer device. The security interposer device may be located between a bus (e.g., a Serial Peripheral Interface (SPI) bus) and a memory that stores a firmware image; and the security interposer device may intercept and control communications (e.g., read and write accesses) with a memory that stores firmware (e.g., a firmware stack for the BMC and firmware for the server platform). Moreover, there may be multiple physical security interposer devices and corresponding multiple security solutions involving these devices.

It may be challenging for a server platform vendor to address the many possible security solutions requested by the vendor's customers. For example, Customer A may expect a specific physical security interposer device-based security solution; and one approach may be for the vendor to provide server platform hardware that includes the physical security interposer device. Customer B may, however, expect a security solution that relies on the BMC to provide a security solution; and one approach may be for the vendor to supply a server platform hardware that does not include a physical security interposer device but rather, relies on the BMC to provide the security solution for Customer B. Customer C may expect a security solution using a different physical security interposer device than Customer A. Providing various server platform hardware versions to accommodate different security solutions may increase product development time and costs and may prevent a platform hardware vendor from pursuing certain business opportunities.

In accordance with example implementations that are disclosed herein, a bridge device (or "bridge"), such as a BMC, contains a secure enclave that is constructed to provide one of a number of different security solutions for a computer system, including security solutions that emulate specific physical security interposer devices. Through trusted firmware that is executed inside the secure enclave, the same hardware may be used to provide any of a number of different security solutions.

In this context, a "bridge device" refers to a hardware component of the computer system, which interconnects multiple buses of the computer system. A bridge device (e.g., a BMC) may perform functions other than interconnecting buses. A "secure enclave" refers to a subsystem of the computer system, for which access into and out of the subsystem is tightly controlled. In accordance with example implementations, the secure enclave performs cryptographic functions for the computer system and is disposed inside a cryptographic boundary. A "cryptographic boundary" in this context refers to a continuous boundary, or perimeter, which contains the logical and physical components of a cryptographic subsystem, such as a secure enclave.

In accordance with example implementations, a BMC contains a management plane and a security plane that is isolated from the management plane. The secure enclave forms the BMC's security plane, i.e., the part of the BMC that provides security services for the computer system; and the security plane is isolated from the BMC's management plane. The management plane, in turn, is the part of the BMC that executes a firmware stack (e.g., an open source BMC firmware stack or a proprietary BMC firmware stack) and provides management services for the computer system.

In accordance with example implementations, among its other features, the secure enclave includes a security processor (e.g., a central processing unit (CPU)); a non-volatile memory (e.g., a memory to store cryptographic keys, a cryptographic identity, and so forth); a volatile memory (e.g., a memory to store firmware that is loaded into the volatile memory and executed by the security processor); a secure bridge to control access into the secure enclave and control outgoing communications from the secure enclave; peripherals (e.g., cryptographic accelerators, a random number generator, a tamper detection circuit, and so forth); and a hardware Root of trust (RoT) engine. The RoT engine validates firmware to be executed by the security processor before the RoT engine loads the firmware into the secure enclave's volatile memory and allows the security processor to execute the firmware.

As used herein, a "Root of Trust device," or RoT device, such as the RoT engine, may be a device that behaves in an expected manner. In other words, the RoT device may be inherently trusted software, hardware, or some combination thereof. A RoT device may include compute engines. The compute engine may be software operating using hardware in the RoT device, hardware of the RoT device, or some combination thereof. A RoT device may include a Root of Trust for Verification (RTV). The RTV performs an integrity measurement or digital signature of program code (e.g., the code loaded into the secure enclave) and validates the code against a predetermined expected value or policy. The RoT device may include a Root of Trust for Storage (RTS). The RTS may be a compute engine capable of maintaining an accurate summary of tamper evident values. For example, the RoT device may include a register that stores a reference hash or a measurement hash. Further, the RoT device may include a plurality of such registers. In another example, the RoT device may include a Root of Trust for Reporting (RTR). The RTR may be a compute engine capable of sending requested information to a requesting device. The information may include the contents in a register of the RoT device (or the contents of the RTS) and information specified by the requester. The RoT device may include other compute engines not described here, such as a compute engine to measure specified values or a compute engine to authenticate.

Through the execution of the validated and loaded firmware, the security processor may validate and load other firmware to be executed by other components of the computer system. For example, the security processor may validate and load firmware to be executed by general purpose processing core(s) of the BMC to perform management services as part of the BMC's management plane. Moreover, in accordance with example implementations that are described herein, the execution of the firmware by the security processor allows a specific security solution of a superset of security solutions to be selected and to be used for the computer system. This superset of security solutions includes one or multiple security solutions, which correspond to physical interposer devices. In this manner, through the execution of trusted firmware instructions, the security processor may emulate responses to security service API calls that are intended to be serviced by a physical interposer device. Therefore, the server platform may be configured solely by trusted firmware to support any of a number of security solutions, including security solutions that are intended to be used with specific physical security interposer devices.

Referring to FIG. 1, as a more specific example, in accordance with some implementations, a computer system 100 contains a BMC 130 that has a secure enclave 140, which may provide a selected security solution of a superset of security solutions for the computer system 100. As examples, the computer system 100 may be a server, a client, a desktop computer, a laptop computer, a tablet computer, a smartphone, a wearable computer, a rack mounted module, a networking device, and so forth.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the computer system 100 includes one or multiple central processing units (CPUs) 102 (e.g., CPU processing cores, semiconductor containing CPU processor cores, and so forth), and memory devices that connected to the CPU(s) 102 to form a system memory 104 The CPU(s) 102 may be coupled to an input/output (I/O) bridge 106, which allows communications between the CPU(s) and the BMC 130, as well as communications with various I/O devices, such as storage drives 122, one or multiple network interface card(s) 124, Universal Serial Bus (USB) devices 126, and so forth. Moreover, as also depicted in FIG. 1, the computer system 100 may include one or multiple Peripheral Component Interconnect Express (PCIe) devices 110 (e.g., PCIe expansion cards) that may be coupled to the CPU(s) 102 through corresponding individual PCIe bus(es) 108. In accordance with a further example implementation, the PCIe device(s) 110 may be coupled to the I/O bridge 106, instead of being coupled to the CPU(s) 102.

The BMC 130, in accordance with example implementations, may control access to a non-volatile memory 168; and in this capacity, the BMC 130 may be viewed as being a bridge device 129 between a bus, or interconnection 171, to the I/O bridge 106 and a bus 167 (e.g., an SPI bus) that is coupled to the memory 168. As depicted in FIG. 1, the memory 168 may store firmware 170. In accordance with example implementations, the firmware 170 contains instructions that are executed by a security processor 142 of the secure enclave 140 of the BMC 130 (as part of the BMC's security plane); instructions that are executed by general processing core(s) 154 of the BMC 130 (i.e., the firmware stack corresponding to the management plane of the BMC 130); and instructions that are executed by the CPU(s) 102 to boot the computer system 100 and provide runtime services.

In general, the memory devices that form the system memory 104, the firmware memory 168 and the nonvolatile memory 164, as well as other memory devices that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with example implementations, the CPU(s) 102 execute machine executable instructions (or "software"), which may be, for example, stored in the system memory 104, for purposes of providing one or multiple applications for the computer system 100. The applications may expect the computer system 100 to employ a specific security solution, and the execution of these applications may generate security service requests (also called "security function requests" or "security requests" herein), which correspond to a specific security solution and request specific security services, or functions, to be performed. In accordance with example implementations, the security service requests may be made via the Intelligent Platform Management Interface (IPMI) keyboard controller style (KCS) system interface. As examples, the security service requests may be requests to store measurement hashes, load reference measurement hashes into a memory of a physical interposer device, construct at least part of a root of trust measurement chain, store cryptographic keys, retrieve cryptographic keys, generate cryptographic keys, validate a firmware image, retrieve a cryptographic platform identity, store measurement hashes, load measurement reference hashes, and so forth.

The security service requests for a particular specific security solution may be associated with security functions that are defined by an API for the security solution. As examples, the security solution may be a first security solution in which the BMC 130 is expected, or intended, to directly handle the security service requests and perform the corresponding security services. As another example, the security service requests may be intended to be handled by a physical security interposer device, such as a device that is physically interposed between the BMC 130 and the memory 168. In this context, a security service request being "intended" to be handled by a particular device (e.g., a physical interposer device or the BMC 130) means that the security service request is sent, or communicated, with an expected result or transformation to occur in response to the request. For example, if a requesting device sends a security service request that is intended to be handled by a physical security interposer device (which is not present), then the requesting device expects a result or transformation that would otherwise be provided if the physical security interposer device was present; and for this example, the BMC 130, instead of a physical security interposer device, provides the expected result or transformation.

In accordance with example implementations, the BMC 130 may be configured, through trusted firmware-configured options to provide a specific security solution for the computer system 100. As such, the computer system 100 may be configured for a specific security solution out of a superset of security functions through the use of firmware, instead of being specifically configured in hardware for the security solution (i.e., instead of many hardware versions being produced corresponding to different security solutions). As such, in accordance with example implementations that are described herein, the BMC 130 provides the same result or transformation as the result or transformation expected to be provided by a physical security interposer device. In other words, in accordance with example implementations, a security service request may be directed to a first security solution that is associated with a physical security interposer device; the BMC 130 receives the request but is not the physical interposer device; the BMC 130 emulates the response of the physical security interposer device to provide the first security solution; and the BMC 130 provides the same result that the physical security interposer device would provide.

In general, after being powered on or reset, the BMC 130 holds its one or multiple general purpose processing cores 154 in reset. After performing initial root of trust security checks as well as other checks (e.g., hardware fault checks), the baseboard management controller 130 releases the general purpose processing core(s) 154 from reset. In accordance with example implementations, the secure enclave 140 contains a hardware, silicon root-of-trust (SRoT) engine 143. In accordance with example implementations, the secure enclave 140 stores an immutable fingerprint, which is used by the SRoT engine 143 to validate machine executable instructions.

More specifically, in accordance with example implementations, in response to the BMC 130 being powered on or reset, the SRoT engine 143 validates and then loads an initial portion of the firmware 170 into a memory 151 of the secure enclave 140 so that this firmware portion is now trusted. The security processor 142 of the secure enclave 140 is then allowed to boot and execute the loaded firmware instructions. By executing the firmware instructions, the security processor 142 may then validate another portion of the firmware 170 that corresponds to a portion of the BMC's management firmware stack and after validation, load this portion of the firmware stack into a memory 155 of the BMC 130. The portion of the management firmware stack may then be executed by the general purpose processing core(s) 154, which causes the processing core(s) 154 to load additional portions of the firmware 170 and place the loaded portions into the memory 164. Access to the memory 164 may involve additional training and initialization steps (e.g., training and initialization steps set forth by the DDR4 specification). Those instructions may be executed from the validated portion of the BMC's firmware stack in the memory 155. In accordance with example implementations, the secure enclave 140 may lock the memory 155 to prevent modification or tampering with the validated portion(s) stored in the memory 155.

Therefore, in accordance with example implementations, the chain of trust may be extended from a silicon, hardware-based root of trust to the management firmware that runs on the BMC's general purpose processing core(s) 154. As described further herein, the security processor's execution of the firmware inside the security enclave 140 allows the secure enclave 140 to provide a specific security solution for the computer system 100.

In accordance with example implementations, the BMC 130 is constructed to prevent a given domain or entity of the BMC 130 from powering up or coming out of reset until the secure enclave 140 validates the domain/entity. Moreover, in accordance with example implementations, the BMC 130 may prevent components of the BMC 130 from accessing resources of the BMC 130 and resources of the computer system 100 until the secure enclave 140 approves/validates the resources. The BMC 130 may perform bus filtering and monitoring (e.g., bus filtering and monitoring for an SPI bus, an SMBus, an I³C bus, and I²C bus, and so forth) to prevent unwanted access to bus devices (such as the memory modules that form the firmware memory 168).

In accordance with example implementations, the BMC 130 may contain a network interface card (NIC) 153 that allows the BMC 130 to communicate (via network fabric 159) with entities that are external to the computer system 100, such as a remote management server 190, entities (e.g., servers) that request security services (as further described herein), and so forth. The BMC 130 may further contain one or multiple additional communication interfaces 156, such as a USB interface, a PCI interface, an SPI interface, an I³C bus interface, and so forth. Moreover, in accordance with example implementations, the BMC 130 may contain components that are not specifically depicted in FIG. 1, such as a physical memory interface, a memory controller interface, a video controller, and so forth.

Figure 2:
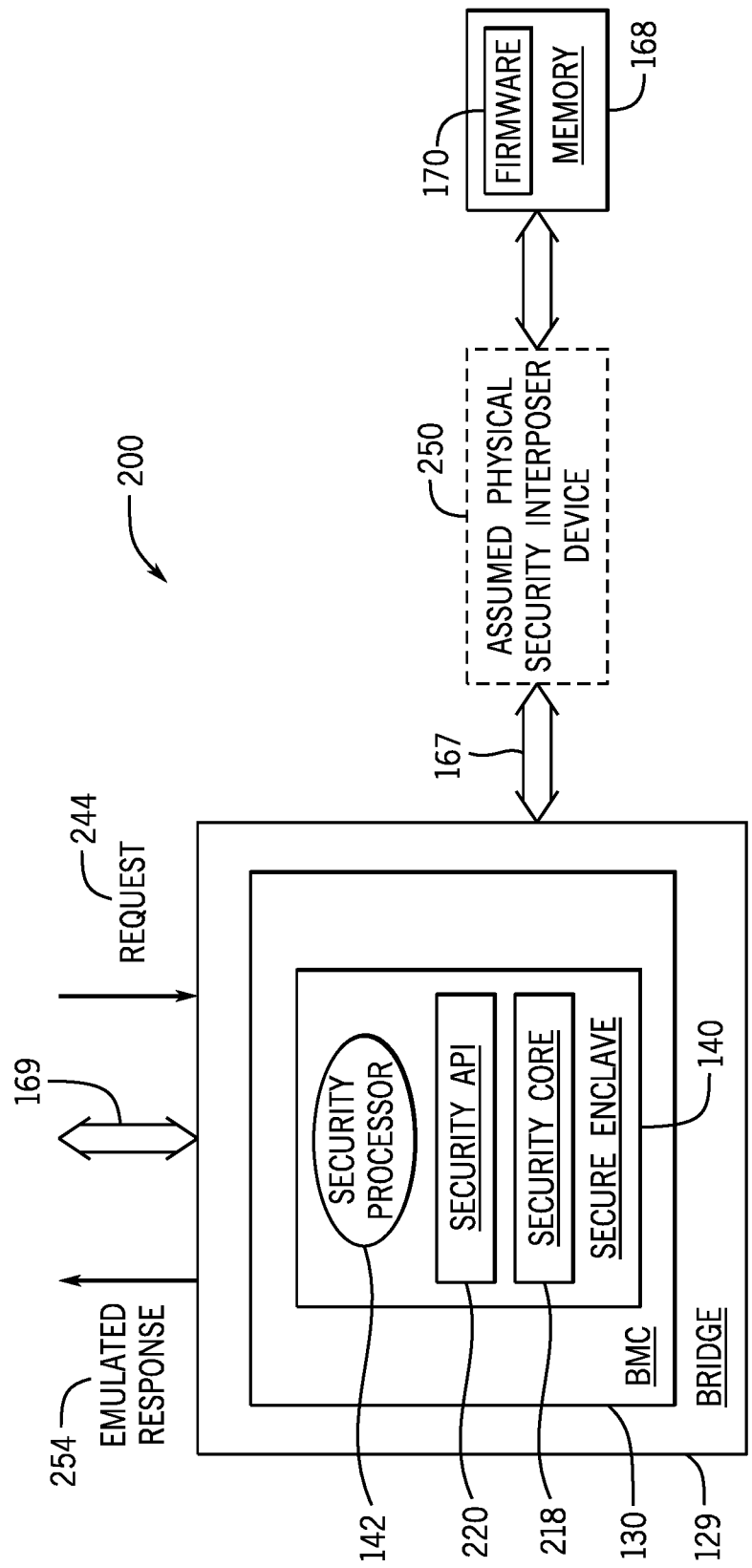
FIG. 2 is an illustration of a bridge emulating a response of a physical security device to a request for a security service according to an example implementation.

Referring to FIG. 2 in conjunction with FIG. 1, in accordance with example implementations, the security processor 142 executes two firmware layers to provide the security solution for the computer system 100: a security core firmware layer 218 (also referred to as a "security core layer 218" herein) and a security API firmware layer 220 (also referred to as a "security API layer 220" herein). In general, the security core layer 218 executes low-level cryptographic primitives to respond to, or perform, the security service requests, such as primitives to store keys, retrieves keys, retrieve a cryptographic identity, store measurement hashes, and so forth. The security API layer 220 is specific to the security solution that is selected for the computer system 100 and provides an abstraction layer between the security service requests and the underlying low-level security primitives. The security physical interposer device (if hypothetically present) relies on the BMC 130 as a bridge to communicate with other components (such as applications executing on the computer system 100 and entities external to the computer system 100). Therefore, as the BMC 130 is in the path of communications and therefore is in position to receive security service requests that are intended for a physical interposer device and emulate the responses of the physical interposer device to the security service requests.

For the example implementation depicted in FIG. 2, in accordance with some implementations, the security API layer 220 may correspond to a security solution that assumes a physical security interposer device. More specifically, as depicted at reference numeral 250, host security service requests (e.g., requests generated by applications executing by the CPU(s) 102), such as example security service request 244, may assume that the computer system 100 includes a physical security interposer device that is coupled to the bus 167 and intercepts communications for the memory 168; and the host security service requests may correspond to API calls that are intended to be handled by the physical security interposer device.

For this example, the security API layer 220 provides the abstraction to, based on the parameters of the request 224, determine the cryptographic primitive(s) to perform; the security core layer 218 performs the cryptographic primitive(s); and the security API layer 220 provides an emulated response 254 of the physical security interposer device.

Although the secure enclave 140 is depicted and described herein as being part of a BMC, in accordance with further example implementations, the secure enclave 140 may be part of a component other than a BMC and provide a security solution for a computer system. For example, the secure enclave 140 may be part of the I/O bridge 106 (FIG. 1) or another component of the computer system 100. As other examples, in accordance with further implementations, the bridge 129 may be part of a standalone component, such as a network switch, a server, a storage appliance, and so forth.

Figure 3:
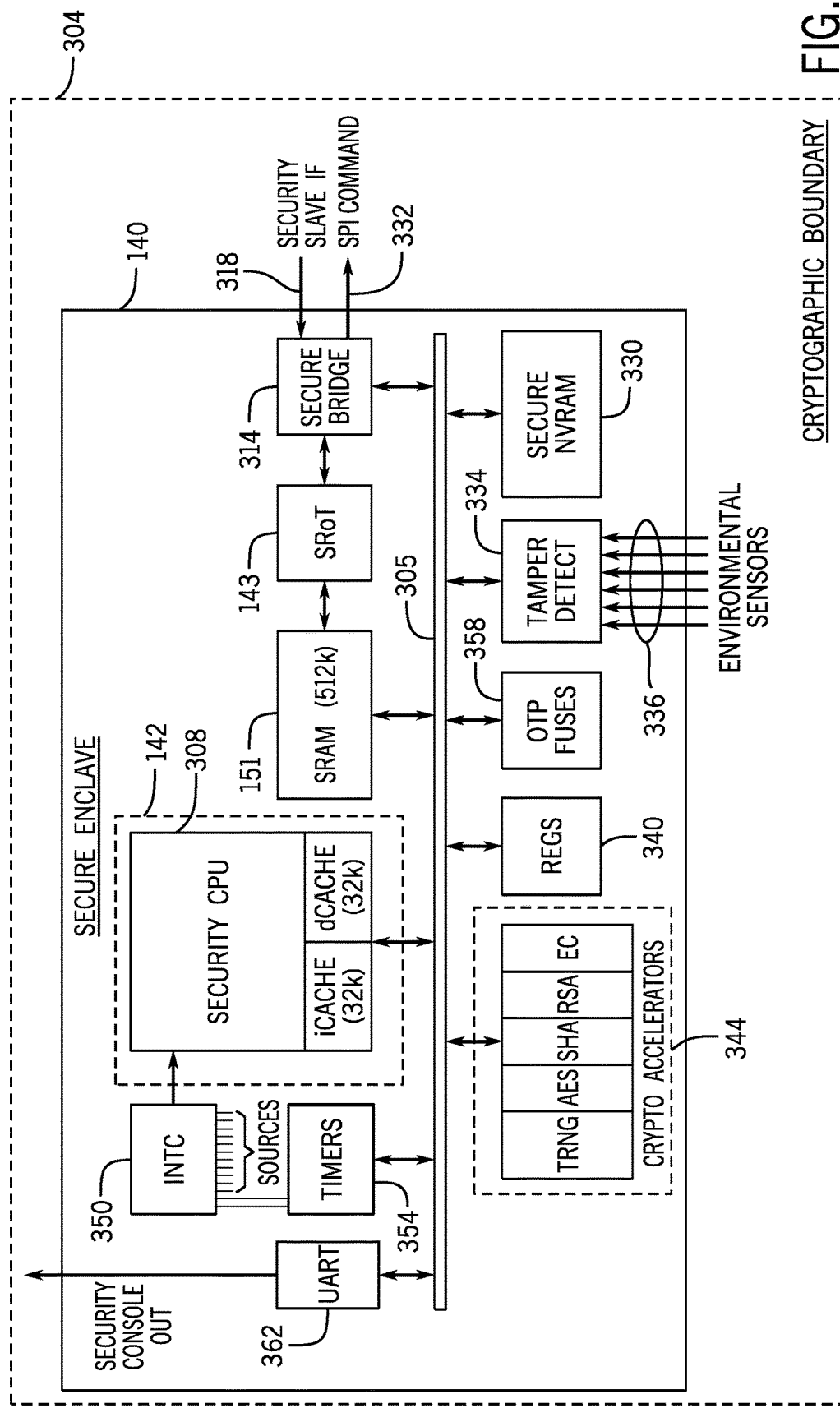
FIG. 3 is a schematic diagram of a secure enclave of a baseboard management controller (BMC) of the computer system of FIG. 1 according to an example implementation.

Referring to FIG. 3, in accordance with example implementations, the secure enclave 140 may be a complete system-on-chip (SOC) and may be contained within a tightly-controlled cryptographic boundary 304. In general, the components of the secure enclave 140 may communicate over a bus 305. In accordance with example implementations, the bus 305 may include one or more of a data bus, a control bus, and a system bus. As depicted in FIG. 3, the security processor 142 may contain one or multiple CPU cores 308; and the volatile memory 151 may be a static random access memory (SRAM). The secure enclave 140 may contain a non-volatile memory 330 (e.g., a non-volatile RAM (NVRAM)) that stores cryptographic keys and a cryptographic identity. Because the non-volatile memory 330 is internal to the BMC 130, the memory 330 is free from probing or tampering. The secure enclave 140 also includes cryptographically secure measurement registers 340 (e.g., measurements in which reference measurement hashes and/or measurement hashes may be stored) and a secure bridge 314.

The secure bridge 314, in accordance with example implementations, controls access into the secure enclave 140 (as indicated at reference numeral 318), through a security services API. Moreover, in accordance with example implementations, the secure bridge 314 provides an additional upstream interface (as depicted at reference numeral 332) to allow the secure enclave 140 to "reach out." The secure enclave 140 uses the interface 322 to obtain its firmware and, in general, to validate the firmware 170. The interface 322 may employ filtering and monitoring on the bus 167 to prevent unwanted access to the memory 168.

As also depicted in FIG. 3, in accordance with example implementations, the secure enclave 140 includes a tamper detection circuit 334, which receives various environmental sensor signals 336 (e.g., sensor signals representing a temperature, a clock rate, a voltage, and so forth) for purposes of detecting malicious manipulation of the secure enclave's operating environment so that appropriate action may be taken when this occurs. In this manner, in accordance with example implementations, when tampering is detected by the tamper detection circuit 334, the tamper detection circuit 334 may initiate one or multiple corrective actions by the secure enclave 140 to address the detected compromise in security. As examples, upon the tamper detection circuit 334 indicating detected tampering, the secure enclave 140 may remove sensitive information (e.g., erase keys and certificates from the non-volatile memory 330), assert a signal or message to alert an external component (e.g., a general purpose processor 154, the operating system, a user interface on a remote management server, and so forth) to the tampering, and so forth.

As also depicted in FIG. 3, the secure enclave 140, in accordance with example implementations, includes cryptographic accelerators 344, such as symmetric and asymmetric cryptographic accelerators, which assist the security processor 142 with such operations as key generation, signature validation, encryption, decryption and so forth. Moreover, the cryptographic accelerators 344 may include a true random number generator to provide a trusted entropy source for cryptographic operations.

Among its other components, in accordance with example implementations, the secure enclave 140 may include one-time programmable (OTP) fuses 358 that store data that represents truly immutable attributes, such as a silicon root-of-trust Secure Hash Algorithm 2 (SHA-2) signature (e.g., the immutable fingerprint used by the SRoT engine 143), a unique identifier (e.g., an identifier used to seed a platform identity certificate), a security enablement fingerprint, and so forth. The secure enclave 140 may have other components that, as can be appreciated by one of ordinary skill in the art, may be present in a processor-based architecture, such as an interrupt controller 350, timers 354, and so forth.

Moreover, the secure enclave 140 may contain interfaces to aid in the initial development and debugging of the secure enclave 140 (in the pre-production mode of the secure enclave 140) but may be disabled completely or may have changed functions (for the production mode of the secure enclave 140) when certain fuses (e.g., certain OTP fuses 358) are blown. For example, these interfaces may include a Universal Asynchronous Receiver/Transmitter (UART) 362 that may be used for the debugging and development of the secure enclave 140 and then secured to a transmit only configuration for the production mode of the secure enclave 140. As an example, in accordance with some implementations, the UART 362 may be configured by the OTP fuses 358 to, in the production mode of the secure enclave 140, provide one-way status health information from the secure enclave 140. As another example, in accordance with further implementations, the OTP fuses 358 may disable the UART 362 for the production mode so that all communication with the UART 362 is disabled to prevent al communication across the cryptographic boundary 304. As another example of an interface that may aid in the initial development and debugging of the secure enclave 140 but may be modified/disabled for the production mode, the secure enclave 140 may include a Joint Test Action Group (JTAG) interface (not shown) for the security CPU 302; and this JTAG interface may be disabled for the production mode of the secure enclave 140.

Figure 4:
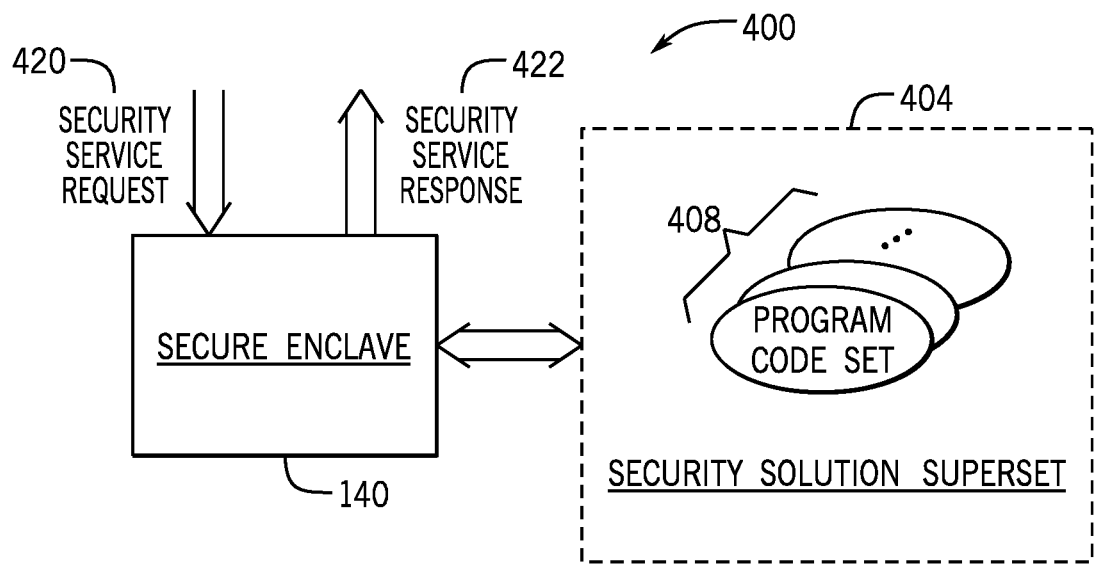
FIG. 4 is an illustration of a secure enclave's selection of a program code set corresponding to a specific security solution according to an example implementation.

Referring to an illustration 400 of FIG. 4, thus, in accordance with example implementations, the secure enclave 140 may be configured, through its firmware, to select a particular program code set 408 that corresponds to a specific security solution of a superset of security solutions 404. In accordance with example implementations, the selected program code set 408 corresponds to the security API layer 220 (see FIG. 2). The secure enclave 140 uses the selected program code set 408 to respond to security service requests, such that the secure enclave 140 responds to a given security service request 420 to provide a corresponding security service response 422.

Referring back to FIG. 1, in accordance with example implementations, security service requests may be generated by entities other than applications that are executed by the CPU(s) 102 of the computer system 100. For example, in accordance with example implementations, service requests may be generated by the general purpose processing cores 154 of the BMC 130 and/or generated by entities that are external to the computer system 100. External security service requests may be generated, for example, by components that use a secure protocol, such as a Secure Shell (SSH) protocol, to communicate with the computer system 100 (e.g., via the NIC 153 of the BMC 130).

As an example of the processing of a specific security service request, the computer system 100 may be a server, and the security solution may correspond to a security solution that is intended to be used with a certain physical security interposer device. For this security solution, the firmware for the secure enclave 140 is configured to emulate the response of the physical security interposer device to security service requests. The following is an example of a specific security service request that may be generated when the server boots and requests permission to become active on a network of servers (i.e., the server asks to "join the fleet"). This process involves the server generating a security service request using an API call that corresponds to the physical interposer device security solution and requests a key. For this example, the key, according to the security solution, is to be a signed manifest of the BMC 130 and other hashes, a hardware identity certificate (e.g., an IDevID certificate) and a nonce (to prevent replays). In response to the API call corresponding to the service request for the key, the security processor 142 extracts the measurement hashes, extracts the hardware identity certificate, generates the key, and provides the key, which allows the server to become active on the network.

Figure 5:
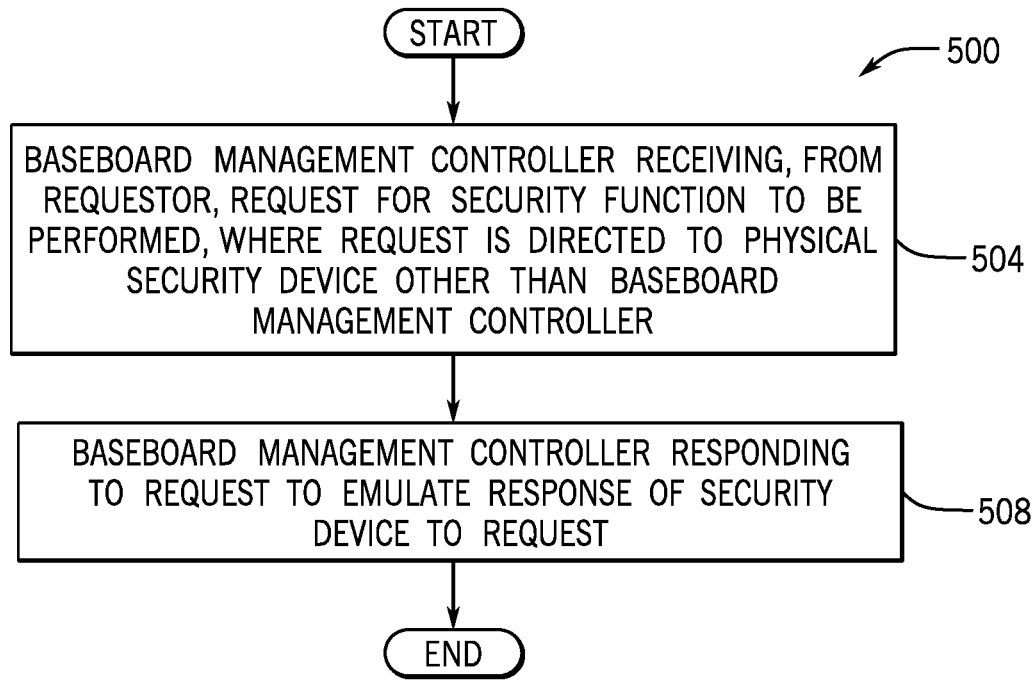
FIG. 5 is a flow diagram depicting a technique in which a BMC responds to a request for a security function by emulating a response of a physical security device according to an example implementation.

Referring to FIG. 5, in accordance with example implementations, a technique 500 includes a baseboard management controller receiving (block 504), from a requestor, a request for a security function to be performed, where the request is directed to a physical security device other than the baseboard management controller. The technique 500 includes, the baseboard management controller responding (block 508) to the request to emulate a response to the security device to the request.

Figure 6:
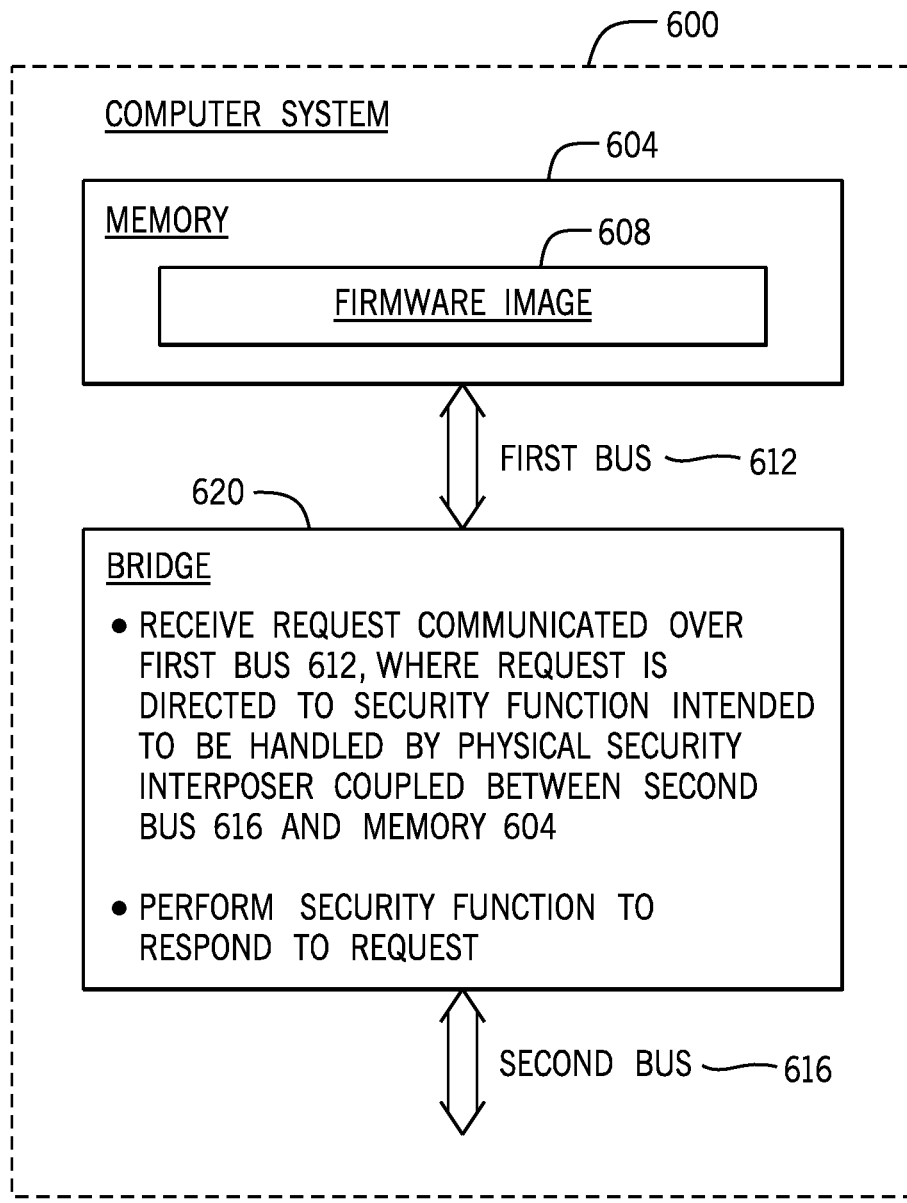
FIG. 6 is a schematic diagram of a computer system containing a bridge to perform a security function intended for a physical security interposer according to an example implementation.

Referring to FIG. 6, in accordance with example implementations, a computer system 600 includes a memory 604 to store a firmware image 608; a first bus 612; a second bus 616; and a bridge 620 between the first bus 612 and the second bus 616. The bridge 620 receives a request that is communicated over the first bus 612, where the request is directed to a security function that is intended to be handled by a physical security interposer, which is coupled between the second bus 616 and the memory 604. The bridge 620 performs the security function to respond to the request.

Figure 7:
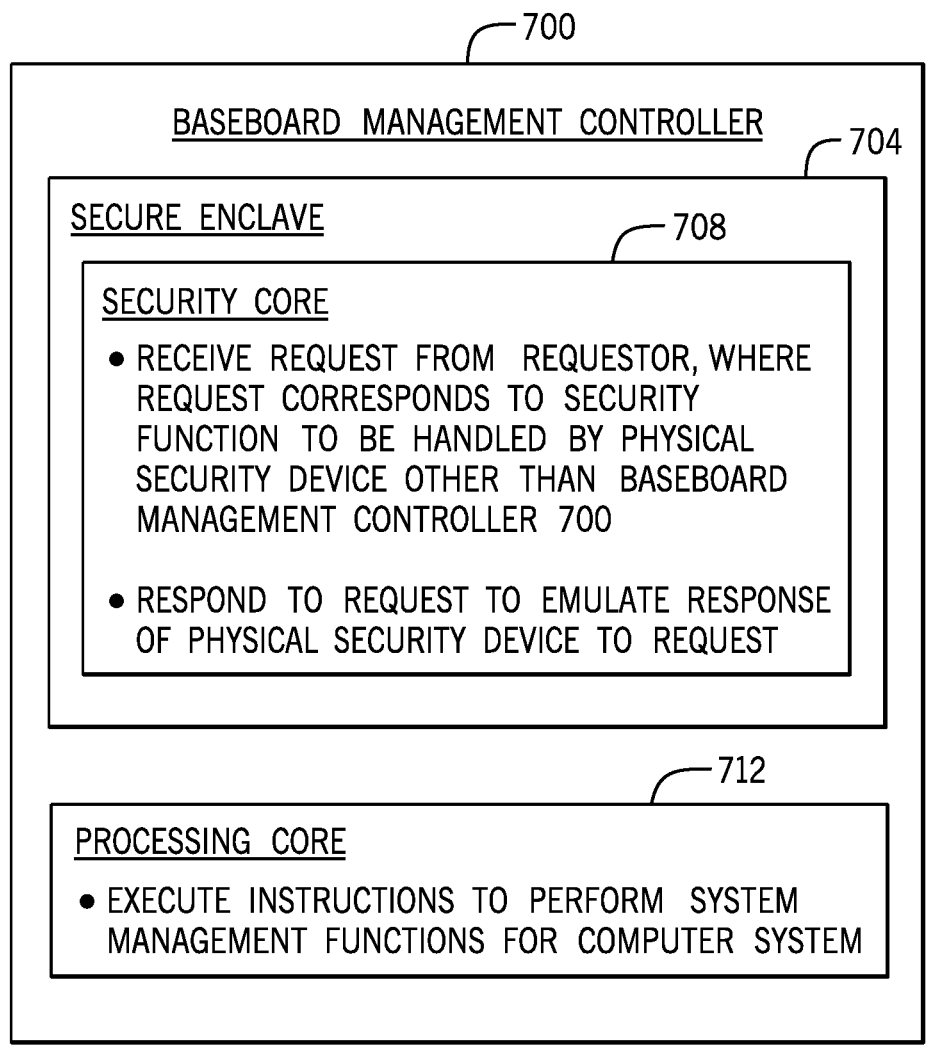
FIG. 7 is a schematic diagram of a BMC containing a secure enclave having a security core to emulate a response of a physical security device according to an example implementation.

Referring to FIG. 7, in accordance with example implementations, a baseboard management controller 700 includes a secure enclave 704 and a processing core 712. The secure enclave 704 includes a security core 708 to receive a request from a requestor, where the request corresponds to a security function to be handled by a physical security device other than the baseboard management controller 700; and respond to the request to emulate a response of the physical security device to the request. The processing core 712 is outside of the secure enclave 704 and executes instructions to perform system management functions for a computer system.

In accordance with example implementations, the baseboard management controller may be part of a server and receiving the request includes receiving the request from an application executing on the server or an entity outside of the server. A particular advantage of this arrangement is that a particular security solution may be provided by the server for internal and external requestors.

In accordance with example implementations, the baseboard management controller may include a secure enclave and firmware inside the secure enclave may be executed to respond to the request. A particular advantage of this arrangement is that server management and security functionality may be divided into separate planes on the baseboard management controller in a way that is inspectable and verifiable.

In accordance with example implementations, the baseboard management controller may include a processing core outside of the secure enclave; the processing core may generate a second security request; and firmware inside the secure enclave may be executed to respond to the second security request. A particular advantage of this arrangement is that server management and security functionality may be divided into separate planes on the baseboard management controller in a way that is inspectable and verifiable.

In accordance with example implementations, executing the firmware may include selecting a set of code of a plurality of sets of code, where the selected set of code corresponds to the physical security device. The physical security device may correspond to a first security solution, and another set of code may correspond to a second security solution other than the first security solution. A particular advantage of this arrangement is that different selectable security solutions may be provided for a computer system without corresponding different computer hardware configurations.

In accordance with example implementations, a hardware root of trust inside the secure enclave may be used to validate the firmware and load the firmware after validation into a memory of the secure enclave. A particular advantage of this arrangement is that a chain of trust for a computer system may be grounded in a hardware root of trust.

In accordance with example implementations, the baseboard management controller may respond to the request by providing a platform cryptographic identity. A particular advantage of this arrangement is that different selectable security solutions may be provided for a computer system without corresponding different computer hardware configurations.

In accordance with example implementations, the baseboard management controller responds to the request by emulating the loading of reference measurement hashes into a memory of the physical security device. A particular advantage of this arrangement is that different selectable security solutions may be provided for a computer system without corresponding different computer hardware configurations.

In accordance with example implementations, the baseboard management controller responds to the request by constructing at least part of a root of trust measurement chain. A particular advantage of this arrangement is that different selectable security solutions may be provided for a computer system without corresponding different computer hardware configurations.

In accordance with example implementations, the baseboard management controller responds to the request by performing key management. A particular advantage of this arrangement is that different selectable security solutions may be provided for a computer system without corresponding different computer hardware configurations.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising: a baseboard management controller receiving, from a requestor, a request for a security function to be performed, wherein the request is directed to a physical security device other than the baseboard management controller, wherein the security function comprises a function to provide a cryptographic identity, provide a platform cryptographic identity, construct at least part of a root of trust measurement chain, generate a cryptographic key, store the cryptographic key, validate a content of a memory, store a measurement hash, load a reference measurement or retrieve the cryptographic key; and the baseboard management controller responding to the request to emulate a response of the physical security device to the request.

2. The method of claim 1, wherein:
the baseboard management controller is part of a server; and
receiving the request comprises receiving the request from an application of the server or an entity outside of the server.

3. The method of claim 1, wherein the baseboard management controller comprises a secure enclave, the method further comprising:
executing firmware inside the secure enclave to respond to the request.

4. The method of claim 3, wherein the baseboard management controller comprises a processing core outside of the secure enclave, the method further comprising:
the processing core generating a second security request; and
executing the firmware inside the secure enclave in response in the second security request.

5. The method of claim 3, wherein executing the firmware comprises:
selecting a set of code of a plurality of sets of code, wherein the selected set of code corresponds to the physical security device, the physical security device corresponds to a first security solution and another set of code of the plurality of sets corresponds to a second security solution other than the first security solution.

6. The method of claim 5, wherein the second security solution corresponds to the baseboard management controller or another physical security device other than the baseboard management controller.

7. The method of claim 3, further comprising:
using a hardware root of trust inside the secure enclave to validate the firmware and load the firmware after validation into a memory of the secure enclave.

8. The method of claim 1, wherein:
the request is associated with an expected result or transformation to occur due to an action taken by the physical security device;
the physical security device is not present; and
the baseboard management device responding to the request comprises the baseboard management controller, instead of the physical security device, providing the expected result or transformation.

9. A computer system comprising:
a memory to store a firmware image;
a first bus;
a second bus; and
a bridge between the first bus and the second bus, wherein the bridge to:
receive a request communicated over the first bus, wherein the request is directed to a security function intended to be handled by a physical security interposer coupled between the second bus and the memory; and
perform the security function to respond to the request.

10. The computer system of claim 9, wherein the bridge comprises a baseboard management controller, and the baseboard management controller comprises:
a first bus interface coupled to the first bus;
a second bus interface coupled to the second bus; and
a secure enclave to respond to the request to perform the security function.

11. The computer system of claim 10, wherein the secure enclave comprises:
a security core layer to execute firmware to perform a plurality of security functions associated with the physical security interposer, including the security function to which the request is directed; and
a security application programming interface (API) layer to respond to the request cause the security core layer to perform the security function to which the request is directed.

12. The computer system of claim 11, wherein the security API layer corresponds to a first code set of a plurality of code sets, wherein the first code set corresponds to the physical security interposer, and a second code set of the plurality of code sets corresponds to a security solution other than a security solution that corresponds to the physical security interposer.

13. The computer system of claim 9, wherein the security function comprises a function to provide a cryptographic identity, store a cryptographic key, validate a content of the memory, store a measurement hash, load a reference measurement or retrieve a cryptographic key.

14. The computer system of claim 9, further comprising at least one central processing unit (CPU), wherein:
the bridge comprises a baseboard management controller;
the firmware image comprises first instructions to be executed by the at least one CPU to boot the computer system; and
the at least one CPU to execute second instructions corresponding to an application to provide the request.

15. A baseboard management controller comprising:
a secure enclave comprising a security core to:
receive a request from a requestor, wherein the request corresponds to a security function to be handled by a physical security device other than the baseboard management controller; and
respond to the request to emulate a response of the physical security device to the request; and
a processing core outside the secure enclave to execute instructions to perform system management functions for a computer system.

16. The baseboard management controller of claim 15, wherein:
the secure enclave further comprises a hardware root of trust and a memory;
the root of trust validates firmware and loads the firmware after validation into the memory; and
the security core executes the firmware to process the request.

17. The baseboard management controller of claim 15, wherein the request originates with an entity of the computer system external to the baseboard management controller, or an entity external to the computer system.

18. The baseboard management controller of claim 15, wherein the security function comprises a function to provide a cryptographic identity, store a cryptographic key, validate a content of a memory, store a measurement hash, load a reference measurement or retrieve a cryptographic key.

19. The baseboard management controller of claim 15, wherein:
the request comprises a request for the physical security device to load a hash into a memory of the physical security device; and
the processing core to further to execute the instructions to emulate the loading of the hash into the memory of the physical security device without the hash being loaded into the memory of the physical security device.

20. A method comprising:
a baseboard management controller receiving, from a requestor, a request for a security function to be performed, wherein the request is directed to a physical security device other than the baseboard management controller; and
the baseboard management controller responding to the request to emulate a response of the security device to the request, wherein the baseboard management controller responding to the request comprises the baseboard management controller emulating loading of reference measurement hashes into a memory of the physical security device.

\* \* \* \* \*